(12) United States Patent
Hara et al.

(10) Patent No.: US 6,669,306 B1
(45) Date of Patent: Dec. 30, 2003

(54) BICYCLE HUB AXLE ASSEMBLY

(75) Inventors: Nobukatsu Hara, Izumisano (JP); Takanori Kanehisa, Sakai (JP); Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/280,062

(22) Filed: Oct. 25, 2002

(51) Int. Cl.$^7$ ................................................ B60B 27/00
(52) U.S. Cl. .................................... 301/110.5; 280/288
(58) Field of Search ............................... 301/59, 110.5, 301/110.6; 280/279, 288

(56) References Cited

U.S. PATENT DOCUMENTS

| | | | |
|---|---|---|---|
| 4,028,915 A | * | 6/1977 | Stahl |
| 4,079,958 A | * | 3/1978 | Segawa |
| 4,964,287 A | * | 10/1990 | Gaul |
| 5,324,100 A | | 6/1994 | James |
| 5,909,931 A | | 6/1999 | Tabe |
| 5,984,423 A | * | 11/1999 | Becker |
| 5,997,104 A | | 12/1999 | Campagnolo |

* cited by examiner

Primary Examiner—Russell D. Stormer
(74) Attorney, Agent, or Firm—Shinjyu Global IP Counselors, LLP

(57) ABSTRACT

A bicycle hub assembly has a hub axle with a nut, a hub shell rotatably support the hub axle by a bearing assembly disposed between the hub axle and the hub. The hub axle and the nut form a bicycle hub axle assembly that is especially configured to permit easy removal and/or installation of a rear derailleur. The hub axle includes a shaft portion having a threaded section at a first axle end and a head portion fixed to a second axle end. The nut has a body portion with a projection extending axially from a frame engaging surface, and a threaded bore threadedly engaged with the threaded section of the shaft portion to secure the bicycle hub axle assembly to the bicycle frame. The projection is configured to engage a slot in a bicycle frame to prevent rotation of the nut relative to the bicycle frame.

15 Claims, 11 Drawing Sheets

BICYCLE HUB AXLE ASSEMBLY

BACKGROUND OF THE INVENTION

1. Field of the Invention

This invention generally relates to a bicycle hub axle assembly. More specifically, the present invention relates to a bicycle hub axle assembly that is especially configured to permit easy removal and/or installation of a rear derailleur.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle.

Recently, some bikers enjoy extremely hard riding in the mountains. When riding in the mountains, the various components can often become damaged. Thus, it is beneficial to have components that are relatively easy to remove and to install. One particular component that is sometimes damaged due to such extremely hard riding in the mountains is the rear derailleur. In particular, the rear derailleur extends outwardly from the bicycle, and thus, is one component that is relatively easy to damage. For example of such situations, the rear derailleur often collide with rocks, woods, artificial obstacle and so on, which results in the rear derailleur having to be replaced. In this case, the rider is forced to change the rear derailleur on the spot, if the rider wishes to continue to ride the bicycle. Thus, it is very helpful to the rider if the removal of the old rear derailleur and the installation of the new rear derailleur is very simple.

Thus, there is a need for a bicycle hub assembly in which the rider can easily change the derailleur without a difficulty. While quick release hubs are well known in the bicycle art, these types of hubs are often not suitable for such extremely hard riding in the mountains. Particularly, it is possible in such situations that the quick release hub can be accidentally released.

In view of the above, there exists a need for an improved bicycle hub axle assembly which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle hub axle assembly that is especially configured to permit easy removal and/or installation of a rear derailleur.

Another object of the present invention is to provide a bicycle hub axle assembly that only requires one tool, e.g., a single wrench.

The foregoing object can be basically attained by providing a bicycle hub axle assembly having a hub axle and a hub axle nut that are especially configured to permit easy removal and/or installation of a rear derailleur. The hub axle includes a shaft portion and a head portion. The shaft portion has a first axle end with a threaded section and a second axle end with a center axis extending between the first and second axle ends. The head portion is fixedly coupled to the second axle end of the shaft portion. The hub axle nut includes a body portion and a projection. The body portion has a frame engaging surface with a threaded bore extending axially from the frame engaging surface. The projection extends axially from the frame engaging surface. The projection is configured to engage a slot in a bicycle frame to prevent rotation of the nut relative to the bicycle frame. The threaded bore is threadedly engaged with the threaded section of the shaft portion to secure the bicycle hub axle assembly to the bicycle frame.

The foregoing object can also be attained by providing a bicycle hub assembly having a hub axle, a hub axle nut, a hub shell and a bearing assembly. The hub axle includes a shaft portion and a head portion. The shaft portion has a first axle end with a threaded section and a second axle end with a center axis extending between the first and second axle ends. The head portion is fixedly coupled to the second axle end of the shaft portion. The hub axle nut includes a body portion and a projection. The body portion has a frame engaging surface with a threaded bore extending axially from the frame engaging surface. The projection extends axially from the frame engaging surface. The projection is configured to engage a slot in a bicycle frame to prevent rotation of the nut relative to the bicycle frame. The threaded bore is threadedly engaged with the threaded section of the shaft portion to secure the bicycle hub axle assembly to the bicycle frame. The hub shell has a first shell end and a second shell end with an inner tubular surface forming a central passage extending between the first and second shell ends. The hub axle is disposed within the central passage of the hub shell. The bearing assembly is disposed between the hub axle and the hub shell to rotatably support the hub shell on the hub axle.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
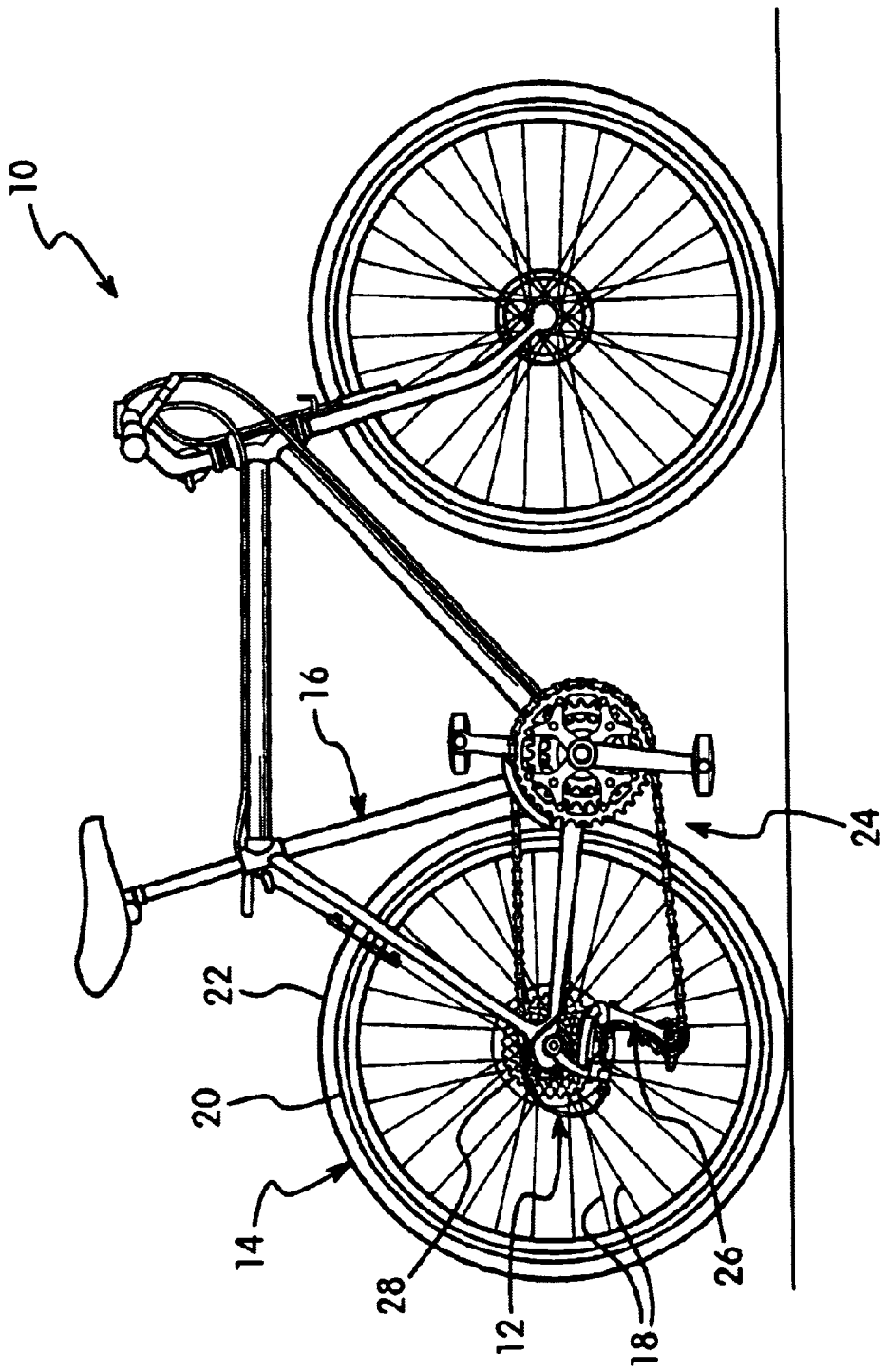
FIG. 1 is a side elevational view of a conventional bicycle with a rear bicycle hub assembly accordance with a first embodiment of the present invention.
Figure 2:
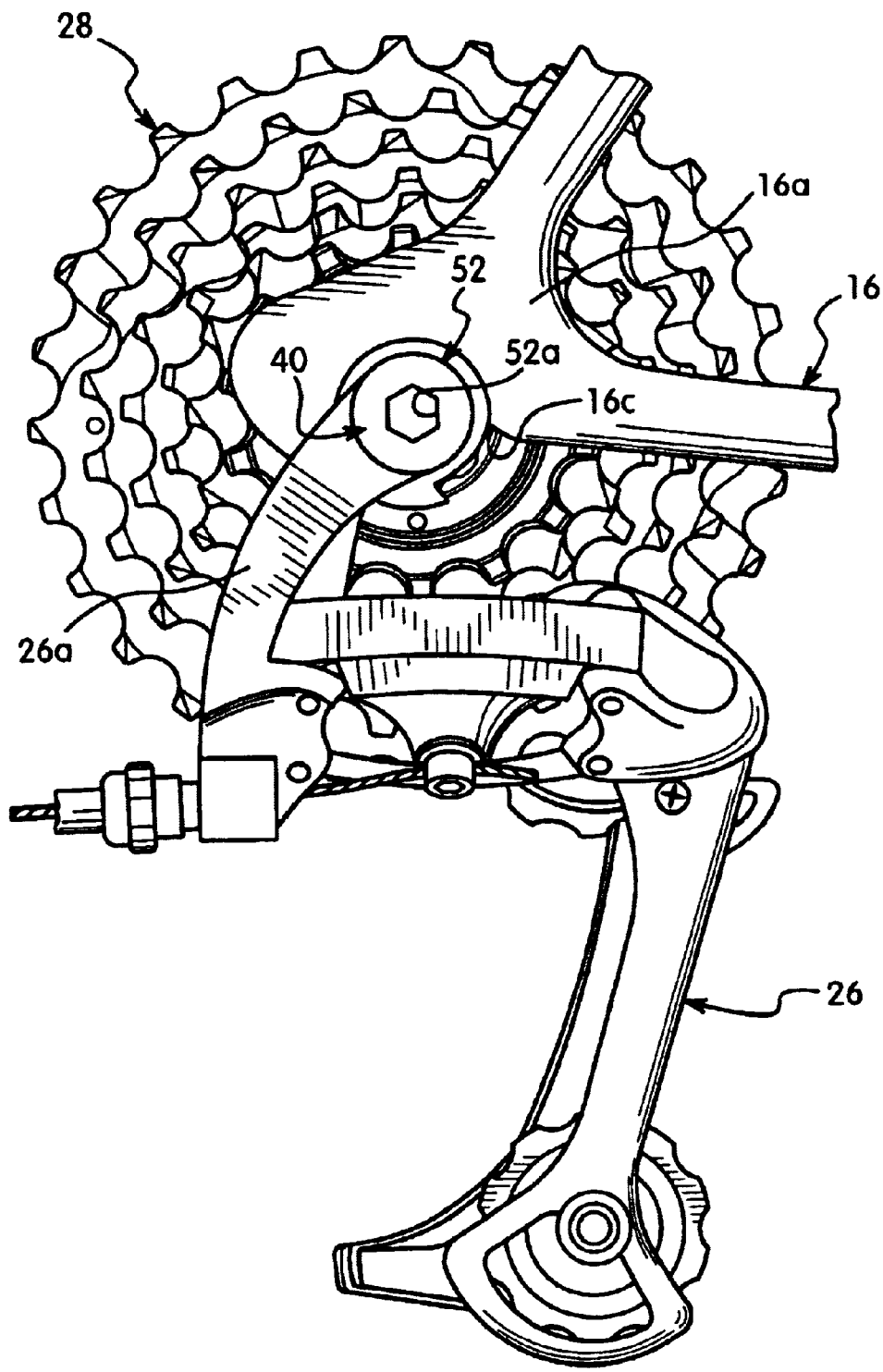
FIG. 2 is a partial, enlarged right side elevational view of the rear bicycle hub assembly illustrated FIG. 1 in accordance with one embodiment of the present invention.
Figure 3:
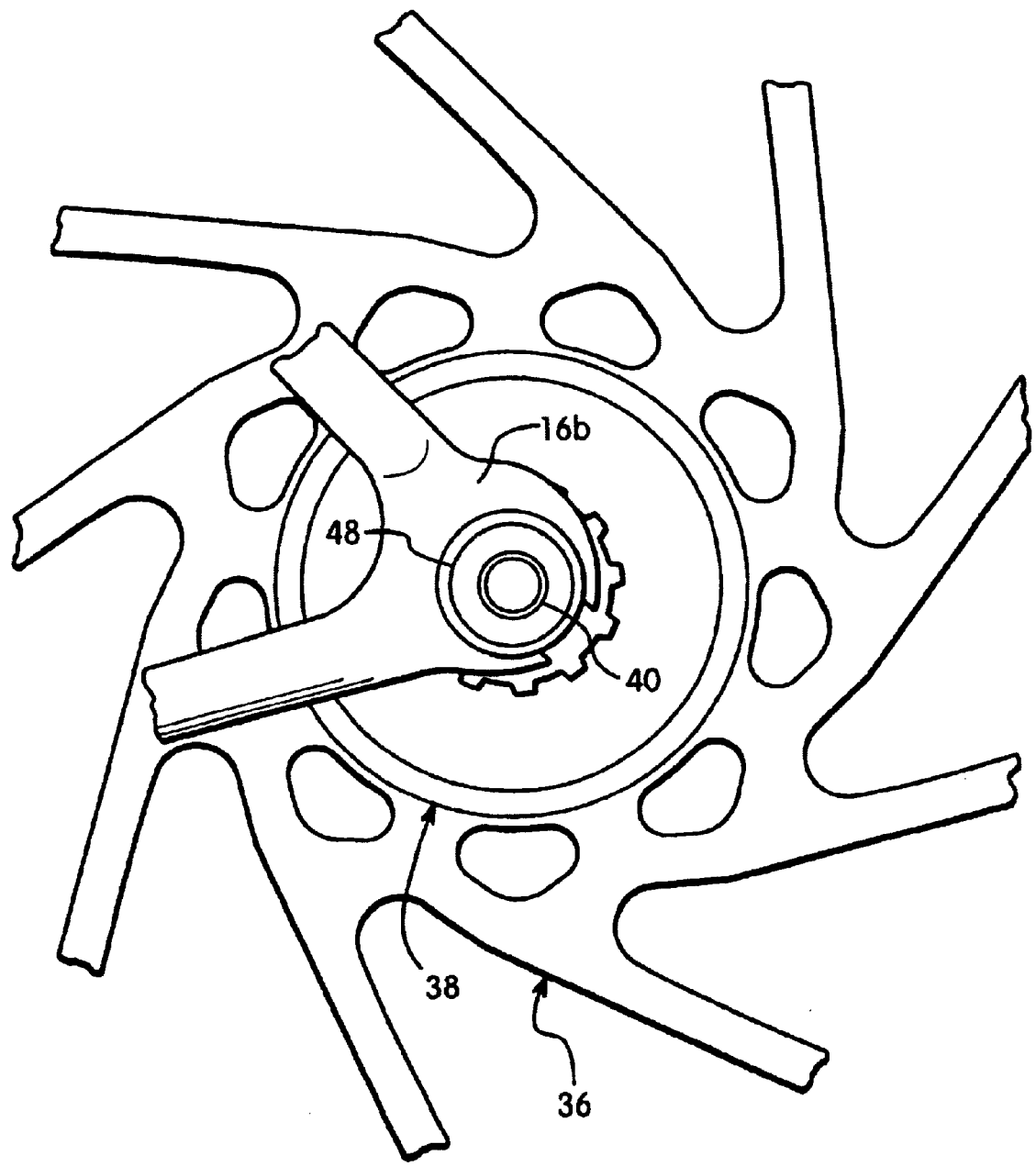
FIG. 3 is a partial, enlarged left side elevational view of the rear bicycle hub assembly illustrated FIG. 1 in accordance with one embodiment of the present invention.

Referring initially to FIGS. 1–3, a bicycle 10 is illustrated with a rear bicycle hub assembly 12 in accordance with a first embodiment of the present invention as discussed below. The rear bicycle hub assembly 12 is part of a rear wheel 14 that is rotatably coupled to a rear fork section of a bicycle frame 16. In particular, the rear wheel 14 has a plurality of spokes 18 extending outwardly the rear bicycle hub assembly 12 to an annular rim 20 by spoke nipples (not shown). A pneumatic tire 22 is mounted on the outer surface of the rim 20 in a conventional manner. The bicycle 10 also includes a drive train 24 for propelling the bicycle 10. The drive train 24 includes a rear derailleur 26 and a set of rear sprockets 28 that are mounted to the rear bicycle hub assembly 12 as explained below.

In the illustrated embodiment, the rear wheel 14 has thirty-two of the spokes 18 extending radially between the rear bicycle hub assembly 12 and the rim 20. Of course, it will be apparent to those skilled in the art from this disclosure that the rear wheel 14 can have fewer or more of the spokes 18 than illustrated, if needed and/or desired. Each of the spokes 18 has an outer threaded end or spoke head coupled to the rim 20 by a spoke nipple and an inner bent end coupled to the rear bicycle hub assembly 12 in a conventional manner. More specifically, the outer ends of the spokes 18 are threadedly coupled to the rim 20 by the spoke nipples to adjust the tension in the spokes 18.

The rim 20 is constructed of a substantially rigid material, such as those materials, which are well known in the art. For example, the rim 20 can be constructed of any suitable metallic material, such as plated steel, stainless steel, aluminum, magnesium or titanium, as well as other non-metallic materials, such as a carbon fiber composite, which can be utilized for a bicycle wheel. The rim 20 is relatively conventional. Therefore, the rim 20 will not be discussed or illustrated in detail herein.

Moreover, since most of the parts of the bicycle 10 are well known in the art, the parts of the bicycle 10 will not be discussed or illustrated in detail herein, except for the parts relating to the rear bicycle hub assembly 12 of the present invention. Moreover, various conventional bicycle parts such as brakes, derailleurs, additional sprocket, etc., which are not illustrated and/or discussed in detail herein, can also be used in conjunction with the present invention.

Figure 4:
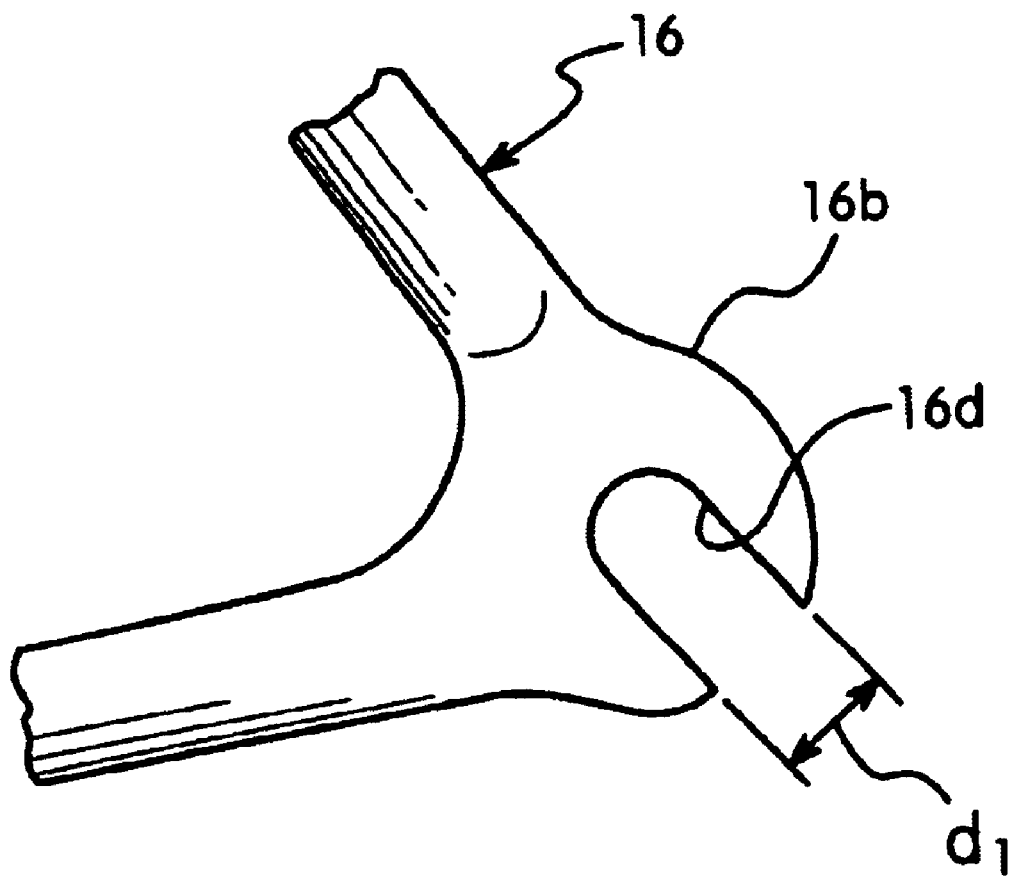
FIG. 4 is a partial left side elevational view of the rear frame portion of the bicycle frame.

As seen in FIGS. 2 and 3, the bicycle hub assembly 12, the rear derailleur 26 and the rear sprockets 28 are all mounted to the rear portion of the bicycle frame 16. In particular, the rear portion of the bicycle frame 16 includes a right frame portion 16a (FIG. 2) and a left frame portion 16b (FIGS. 3 and 4). The right frame portion 16a has a slot or slit 16c and the left frame portion 16b has a slot or slit 16d. The slots 16c and 16d are sized to receive a portion of the bicycle hub assembly 12, as discussed below, and to retain the bicycle hub assembly 12, the rear derailleur 26 and the rear sprocket 28 thereto. As seen in FIG. 4, the slot 16d has a width d, which is typically approximately ten millimeters. As explained below, this slot 16d cooperates with the bicycle hub assembly 12 to assist in the removal and installation of the rear derailleur 26.

Figure 5:
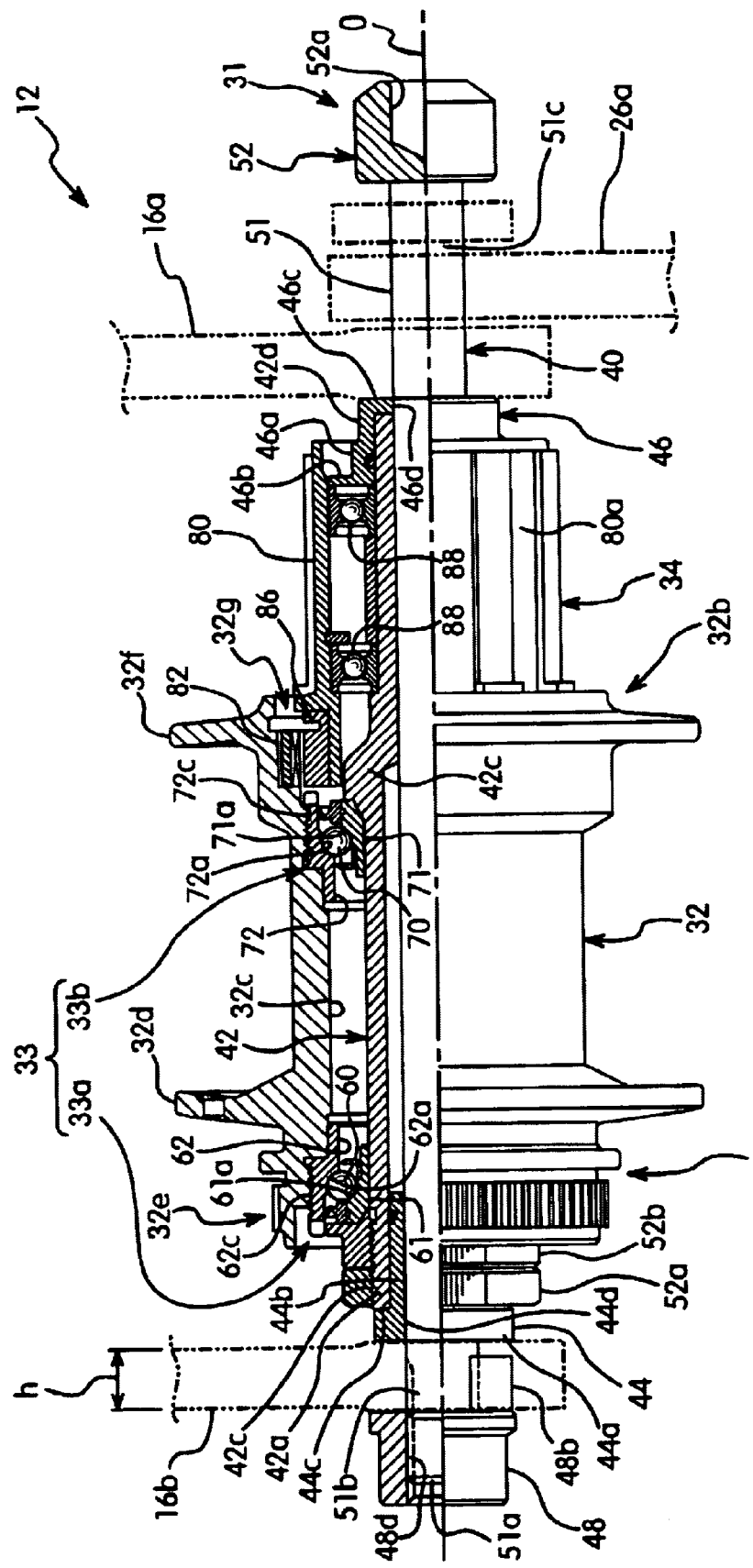
FIG. 5 is a partial longitudinal cross-sectional view of the rear bicycle hub assembly illustrated FIGS. 1–3 in accordance with the first embodiment of the present invention.

Referring now to FIGS. 2 and 5, the rear derailleur 26 is a conventional component, and thus, the derailleur 26 will not be discussed or illustrated in detail herein. The rear derailleur 26 is mounted to the bicycle hub assembly 12 by a hanger portion 26a. While the hanger portion 26a is illustrated as having a hole, it will be apparent to those skilled in the art from this disclosure that the hanger portion 26a can be in the form of a hook with an open slot.

The bicycle hub assembly 12 basically includes a hub axle assembly 31, a hub shell 32, a bearing assembly 33 and a freewheel 34 for receiving the rear sprockets 28. The bearing assembly 33 includes a pair of bearings 33a and 33b that rotatably support the hub shell 32 on the hub axle assembly 31 as explained below. Optionally, as seen in FIG. 3, a disc brake rotor 36 is removably attached to the rear bicycle hub assembly 12 by a locking ring 38 on the left side of the hub shell 32, which is opposite the freewheel 34. The hub axle assembly 31 is especially configured to permit easy removal and/or installation of the rear derailleur 20.

Referring now to FIGS. 5–9, the hub axle assembly 31 basically includes a hub axle or spindle 40, a hub sleeve 42, a left hub sleeve end member 44, a right hub sleeve end member 46 and a hub axle nut 48. The hub axle assembly 31 rotatably supports the hub shell 32 via the bearings 33a and 33b and the freewheel 34. As explained below, the freewheel 34 limits rotation of the hub shell 32 to one rotational direction relative to the hub axle assembly 31. While the hub axle nut 48 is illustrated on the left side of the hub assembly 12 for easily changing a broken derailleur, it will be apparent to those skilled in the art that the hub axle 40 can be reversed so that the hub axle nut 48 is located on the right side of the hub assembly 12.

Figure 7:
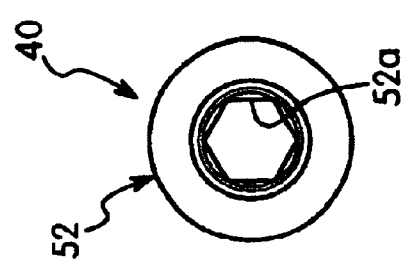
FIG. 7 is an elevational view of the hub axle of the rear bicycle hub assembly illustrated ink FIGS. 1–3.
Figure 6:
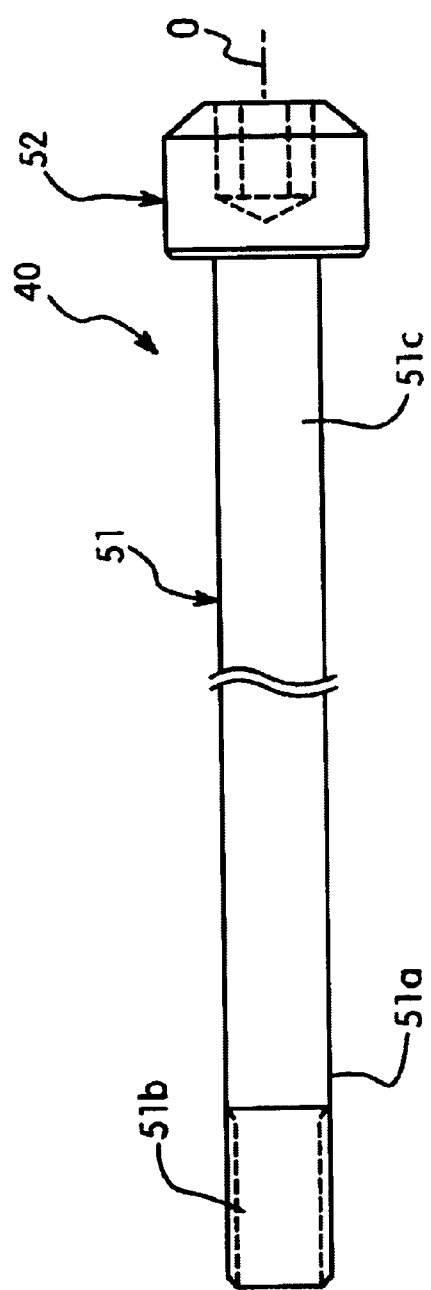
FIG. 6 is an elevational view of the hub axle of the rear bicycle hub assembly illustrated FIGS. 1–3.

As best seen in FIGS. 5–7, the hub axle or spindle 40 is a hard, rigid member that includes a shaft portion 51 and a head portion 52. The shaft portion 51 and the head portion 52 are preferably integrally formed as a one-piece, unitary member from a suitable hard, rigid material. The hub axle 40 and the hub axle nut 48 contact the bicycle frame 16 to secure the hub axle assembly 31 thereto. The shaft portion 51 has a first axle end 51a with a threaded section 51b and a second axle end 51c and the head portion 52 fixedly coupled to the second axle end 51c. A center axis O extends longitudinally between the first and second axle ends 51a and 51c.

The head portion 52 of the hub axle 40 is configured with a tool engagement surface 52a. The tool engagement surface 52 of the head portion 52 is an axially extending blind bore with a non-circular transverse cross section, preferably a hexagonal cross section.

The hub sleeve 42 is a tubular member that is concentrically mounted on the hub axle 40. The hub sleeve 42 has a first end 42a with external threads 42b, a center annular abutment 42c and a second end 42d with the freewheel 34 fixedly coupled thereto. The external threads 42b of the hub sleeve 42 receive a pair of locking nuts 52a and 52b. The locking nuts 52a and 52b retain the bearings 33a and 33b between the hub shell 32 and the hub sleeve 42. The hub sleeve 42 has a center bore 42e that receives the hub axle 40 therein. As mentioned above, the first and second bearings 33a and 33b rotatably support the hub shell 32 relative to both the hub axle 40 and the hub sleeve 42. The center annular abutment 42c axially supports the second bearing 33b such that an axial compressive force is applied to the first and second bearings 33a and 33b by the locking nuts 52a and 52b when they are threaded on to the external threads 42b of the hub sleeve 42.

Figure 14:
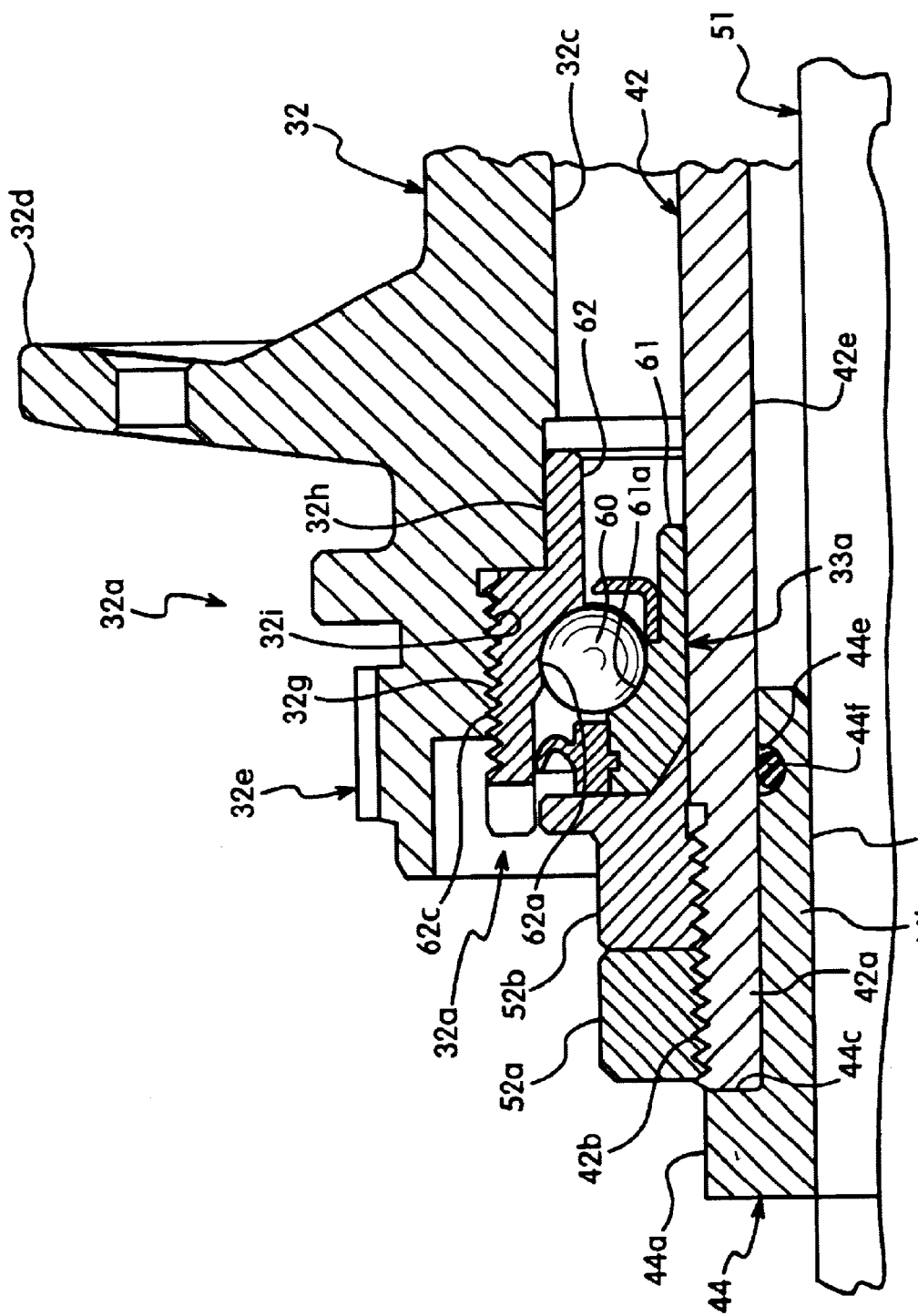
FIG. 14 is a partial, enlarged cross-sectional view of the left end of the hub shell of the rear bicycle hub assembly in accordance with the first embodiment of the present invention.

As best seen in FIG. 14, the left hub sleeve end member 44 is a tubular step-shaped member that has a first tubular section 44a and a second tubular section 44b. The left hub sleeve end member 44 is fixedly coupled to the first end 42a of the hub sleeve 42. Preferably, the left hub sleeve end member 44 is press-fitted into the center bore 42e of the first end 42a of the hub sleeve 42. The first tubular section 44a preferably has a larger diameter than the second tubular section 44b so as to form a radial abutment surface 44c that contacts the axial end surface of the first end 42a of the hub sleeve 42. The second tubular section 44b has an outer diameter that is a size to be received within the center bore 42e of the hub sleeve 42 at the first end 42a of the hub sleeve 42. The left hub sleeve end member 44 has a center bore 44d that is sized to slidably receive the shaft portion 51 of the hub axle 40 therein. Thus, the hub axle 40 can be easily removed from the hub sleeve 42 to replace the rear derailleur 20.

Preferably, the outer surface of the second tubular section 44b has an annular recess 44e with an elastomeric O-ring or sealing member 44f located therein. The sealing member 44f frictionally retains the left hub sleeve end member 44 in the center bore 42e of the first end 42a of the hub sleeve 42. The sealing member 44f also forms a seal between the interface of the outer surface of the second tubular section 44b and the inner surface of the center bore 42e of the hub sleeve 42.

Figure 16:
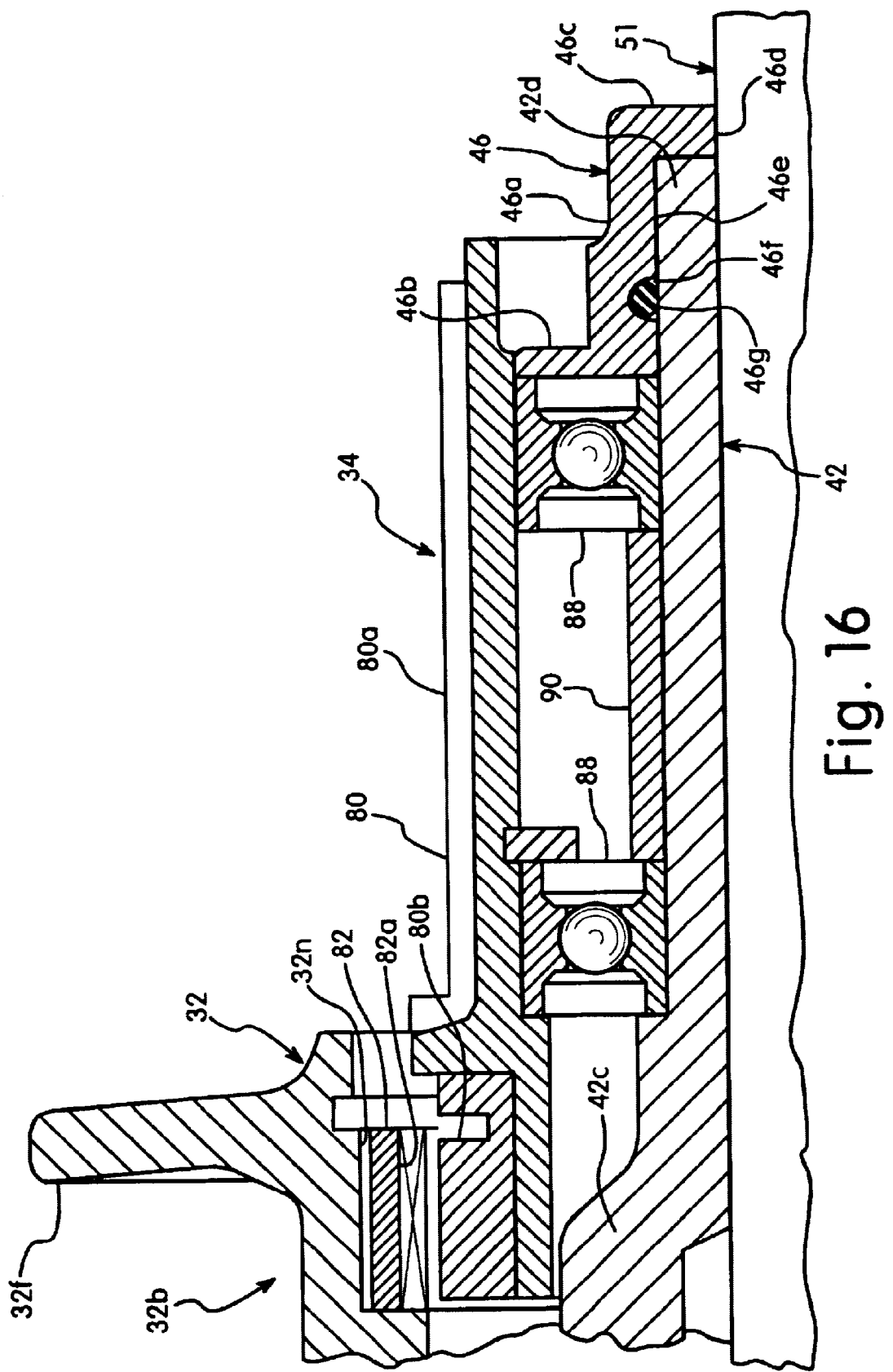
FIG. 16 is a partial, enlarged cross-sectional view of the freewheel for the rear bicycle hub assembly in accordance with the first embodiment of the present invention.

As best seen in FIG. 16, the right hub sleeve end member 46 is a cup-shaped member that is fixedly coupled to the second end 42d of the hub sleeve 42. The freewheel 34 is retained on the hub sleeve 42 by the right hub sleeve end member 46. Basically, the right hub sleeve end member 46 has a center step-shaped tubular portion 46a with an outwardly extending flange 46b at its inner axial end and inwardly extending flange 46c at the outer axial end. Preferably, the outwardly extending flange 46a is sized to seal the outer axial end of the freewheel 34. The inwardly extending flange 46c has a center opening 46d that is slightly larger than the diameter of the shaft portion 51 of the hub axle 40 such that the hub axle 40 can move freely within the hub sleeve 42.

Preferably, the inner tubular surface 46e of the center tubular portion 46a has annular recess 46f with an elastomeric O-ring or sealing member 46g located therein. The sealing member 46g frictionally retains the right hub sleeve end member 46 on the second end 42d of the hub sleeve 42. The sealing member 46g also forms a seal between the interface of the outer surface of the second end 42d of the hub sleeve 42 and the the inner tubular surface 46e of the center tubular portion 46a.

Figure 10:
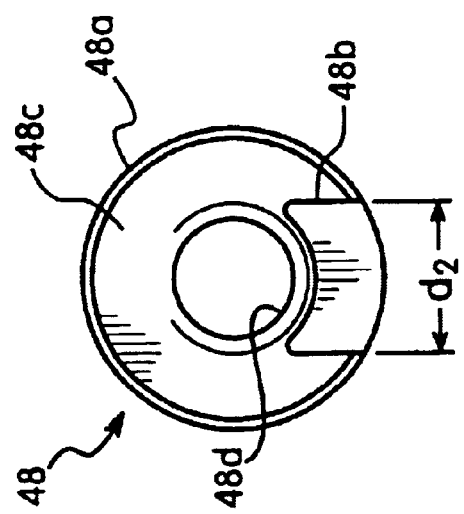
FIG. 10 is a second end elevational view of the hub axle nut illustrated in FIGS. 8 and 9 for the hub axle illustrated in FIGS. 6 and 7.
Figure 9:
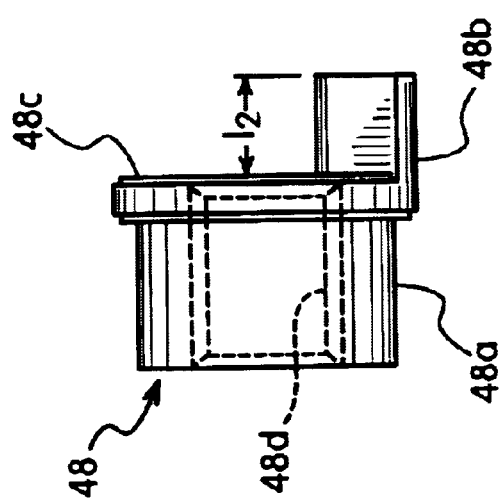
FIG. 9 is a side elevational view of the hub axle nut illustrated in FIG. 7 for the hub axle illustrated in FIGS. 6 and 7.
Figure 8:
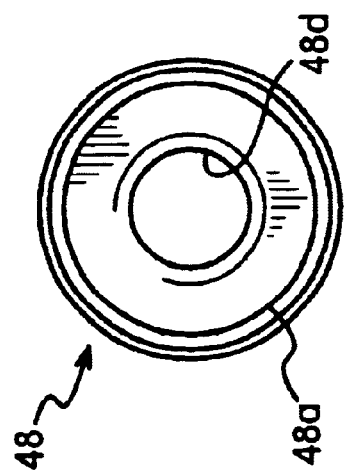
FIG. 8 is a first end elevational view of the hub axle nut for the hub axle illustrated in FIG. 5 for the rear bicycle hub assembly illustrated in FIGS. 1–3.

As best seen in FIGS. 8–10, the hub axle nut 48 is a hard, rigid one-piece, unitary member that includes a step-shaped body portion 48a and a projection 48b. The body portion 48a has a pair of cylindrical sections with circular transverse cross sections. The body portion 48a has a frame engaging surface 48c with a threaded bore 48d extending axially from the frame engaging surface 48c. As seen in FIG. 5, the projection 48b extends axially from the frame engaging surface 48c. The projection 48b is configured to engage the slot 16d in the bicycle frame 16 to prevent rotation of the hub axle nut 48 relative to the bicycle frame 16. The threaded bore 48d is threadedly engaged with the threaded section 51b of the shaft portion 51 to secure the bicycle hub axle assembly 31 to the bicycle frame 16.

The projection 48b preferably has an axial length $l_2$ of approximately 7 millimeters as measured in the axial direction and a width $d_2$ of approximately 9.7 millimeters to approximately 9.9 millimeters as measured in a generally circumferential direction. In any event, the axial length $l_2$ of the projection 48b needs to be smaller than the thickness or axial length $l_1$ of the frame section 16b where the hub axle nut 48 contacts the frame section 16b. In the case where the thickness or axial length $l_1$ of the frame section 16b is ten millimeters, the axial length $l_2$ of the projection 48b needs to be less than ten millimeters. Also, the width $d_2$ of the projection 48b needs to be smaller than the width $d_1$ of the slot 16d of the frame section 16b. In the case where the width $d_1$ is ten millimeters, the width $d_2$ of the projection 48b needs to be less than ten millimeters.

Figure 13:
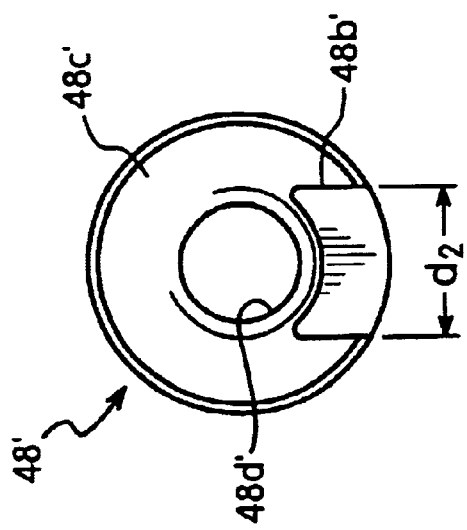
FIG. 13 is a second end elevational view of the modified hub axle nut illustrated in FIGS. 10 and 11 for use with the hub axle illustrated in FIGS. 6 and 7 in accordance with the second embodiment of the present invention.
Figure 12:
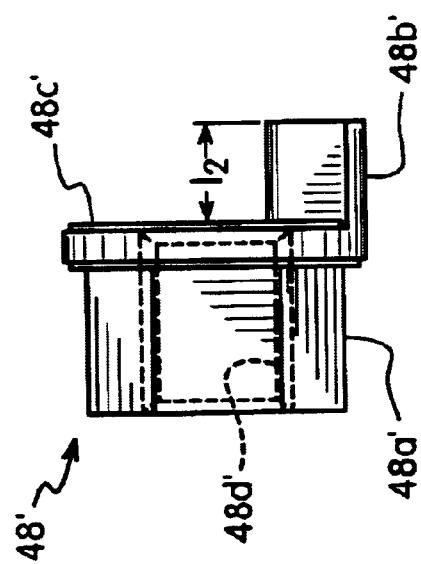
FIG. 12 is a side elevational view of the modified hub axle nut illustrated in FIG. 9 for use with the hub axle illustrated in FIGS. 6 and 7 in accordance with the second embodiment of the present invention.
Figure 11:
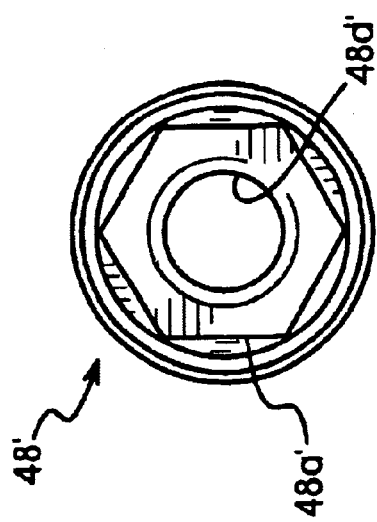
FIG. 11 is a first end elevational view of a modified hub axle nut for use with the hub axle illustrated in FIGS. 6 and 7 in accordance with a second embodiment of the invention.

As seen in FIGS. 11–13, an alternative or modified hub axle nut 48' is illustrated in accordance with the present invention. The modified hub axle nut 48' has a body portion 48a' and a projection 48b'. Similar to the first embodiment, the shaft portion 48a' and a projection 48b' are integrally formed as a one-piece, unitary member.

In this embodiment, the body portion 48a' has a non-circular transverse cross section, preferably a hexagonal cross section. The body portion 48a' has a frame engaging surface 48c' with a threaded bore 48d' extending axially from the frame engaging surface 38c', and a projection 48b' extending axially from the frame engaging surface 38c'. The projection 48b' is configured to engage the slot 16d in the bicycle frame section 16b. The threaded bore 38d' is threadedly engaged with the threaded section 51b of the first axle end 51a of the shaft portion 51.

The projection 48b' preferably has an axial length $l_2$ of approximately 7 millimeters as measured in the axial direction and a width $d_2$ of approximately 9.7 millimeters to approximately 9.9 millimeters as measured in a generally circumferential direction. In any event, the axial length $l_2$ of the projection 48b' needs to be smaller than the thickness or axial length $l_1$ of the frame section 16b where the hub axle nut 48' contacts the frame section 16b. In the case where the thickness or axial length $l_1$ of the frame section 16b is ten millimeters, the axial length $l_2$ of the projection 48b' needs to be less than ten millimeters. Also, the width $d_2$ of the projection 48b' needs to be smaller than the width $d_1$ of the slot 16d of the frame section 16b. In the case where the width $d_1$ is ten millimeters, the width $d_2$ of the projection 48b' needs to be less than ten millimeters.

Preferably, the hub shell 32 is preferably formed as a one-piece, unitary member. It will be apparent to those skilled in the art that the hub shell 32 can be constructed of any substantially rigid material, such as those materials, which are known in the art. For example, the hub shell 32 can be constructed of any suitable metallic material, such as plated steel, stainless steel, aluminum, magnesium or titanium, as well as other non-metallic materials, such as carbon fiber composite, ceramic or plastic. Of course, the hub shell 32 could be constructed of several pieces of various different materials as need and/or desired.

Referring again to FIG. 5, the hub shell 32 has a first or left shell end 32a and a second or right shell end 32b with a center tubular portion 32c located therebetween. The first and second hub shell ends 32a and 32b are integral formed with the center tubular portion 32c as a one-piece, unitary member. The hub shell 32 is a tubular member having an inner tubular surface forming a central interior passage extending between the first and second shell ends 32a and 32b. The hub axle 40 is disposed within the central passage of the hub shell 32. The first and second bearing 33a and 33b rotatably support the hub shell 32 on the hub axle 40 via the hub sleeve 42 for rotating the hub shell 32 relative to the hub axle 40 and the hub sleeve 42.

The first shell end 32a has a first spoke attachment portion or flange 32d and a brake rotor attachment portion 32e, while the second shell end 32b has a second spoke attachment portion or flange 32f and the freewheel 34 operatively coupled thereto. Thus, the rim 20 is coupled to the first and second spoke flanges 32d and 32f via the spokes 18. The first spoke flange 32d is preferably an annular member with a plurality of first spoke holes (e.g., sixteen in the illustrated embodiment but only one shown in FIG. 5). In this embodiment, the first spoke holes are equally spaced apart about the imaginary circle that is centered on the axis O. The first spoke holes are arranged to receiving the bent ends of the spokes 18. Similarly, the second spoke flange 32f is preferably an annular member with a plurality of second spoke holes in the second spoke flange 32f for receiving the bent ends of the spokes 18. In the illustrated embodiment, the second spoke holes are equally spaced apart about the imaginary circle that is centered on the center axis O of the hub axle assembly 31. Accordingly, the bicycle hub assembly 12 is designed to have the spokes 18 extending outwardly from the first and second spoke flanges 32d and 32f in a generally tangential direction.

The first and second spoke attachment portions 32a and 32b and the brake rotor attachment portion 32e are integrally formed with the hub shell 32 as a one-piece, unitary member. In particular, the first hub shell end 32a has the first spoke flange 32d and the brake rotor attachment portion 32e integrally mounted thereon, while the second hub shell end 32b has the second spoke flange 32f integrally mounted thereon.

The brake rotor attachment portion 32e is integrally formed with the first hub shell end 32a of the hub shell 32 as a one-piece, unitary member. The brake rotor attachment portion 32e is also disposed at the first hub shell end 32a adjacent the first spoke flange 33d. The brake rotor attachment portion 32e is a tubular member, which has a tubular section with an external splines and an annular abutment flange extending outwardly from the tubular section in a radial direction. The annular abutment flange is spaced from the free end of the tubular section of the brake rotor attachment portion 32e. The tubular section of the brake rotor attachment portion 32e also has an annular internal surface with internal threads. The axially extending external splines of the brake rotor attachment portion 32e non-rotatably engage the disc brake rotor 36. The internal threads of the brake rotor attachment portion 32e threadedly engage the locking ring 38. Thus, the disc brake rotor 36 is non-rotatably secured to the brake rotor attachment portion 32e by the locking ring 38.

Referring to FIG. 14, the inner tubular surface of the hub shell 32 includes a first step shaped portion including first and second axial step sections 32g and 32h formed at the first shell end 32a with first axial step section 32g having the first internal threads 32i formed thereon. The first internal threads 32i fixedly secure the first bearing 33a to the first shell end 32a.

Figure 15:
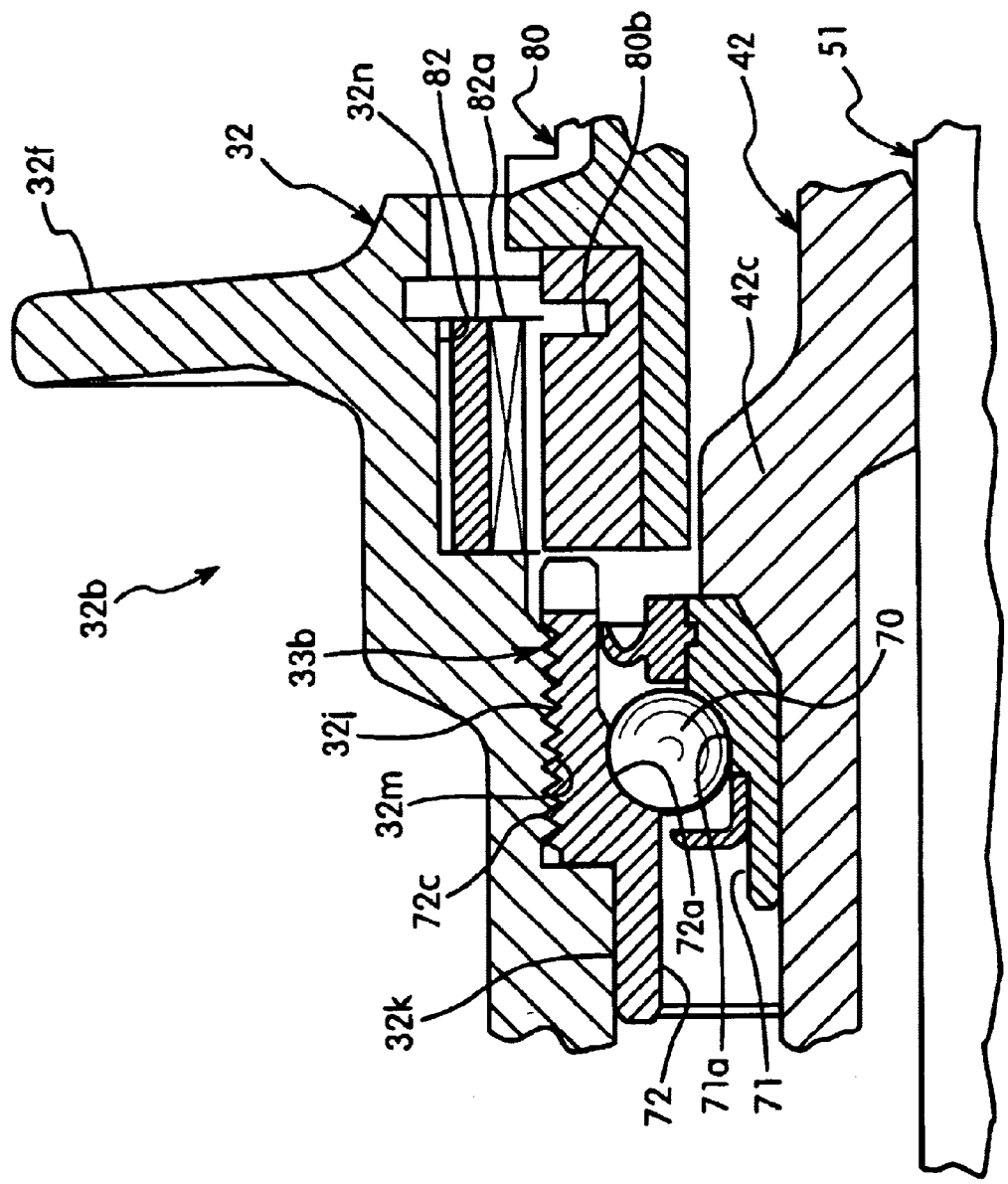
FIG. 15 is a partial, enlarged cross-sectional view of the right end of the hub shell of the rear bicycle hub assembly in accordance with the first embodiment of the present invention.

Referring to FIG. 15, the inner tubular surface of the hub shell 32 includes a second step shaped portion including first and second axial step sections 32j and 32k formed at the second shell end 32b with the first axial step section 32j having second internal threads 32m formed thereon. The second internal threads 32m fixedly secure the second bearing 33b to the second shell end 32b.

As mentioned above, the first and second bearings 33a and 33b rotatably support the hub shell 32 relative to both the hub axle 40 and the hub sleeve 42. The first and second bearings 33a and 33b are axially retained between the center annular abutment 42c and the locking nuts 52a and 52b. When the locking nuts 52a and 52b are threaded on to the external threads 42b of the hub sleeve 42, an axial compressive force is applied to the first and second bearings 33a and 33b.

Since bearings, similar to the bearings 33a and 33b illustrated in FIG. 5, are well known in the bicycle art, the bearing 33a and 33b will not be discussed or illustrated in detail herein. The first side bearing 33a is disposed between the first axle end 40a of the hub axle 40 and the first shell end 32a of the hub shell 32 to rotatably support the first shell end 32a of the hub shell 32 on the first axle end 40a of the hub axle 40. The first or left side bearing 33a includes a plurality of first rolling members or balls 60 disposed between a first inner race 61 supported on the first axle end of the hub axle 40 and a first outer race 62 threadedly coupled to the first internal threads 32i of the hub shell 32.

The first inner race 61 includes a first inner angular bearing surface 61a contacting one axial side of the first rolling members 60 such that the first inner angular bearing surface 61a contacts and supports each of the first rolling members 60 at an inner peripheral area and an axial facing area. The first inner angular bearing surface 61 a faces generally towards the second axle end of the hub shell 32.

The first outer race 62 includes a first outer angular bearing surface 62a contacting the first rolling members 60 on an axial side that is opposite from the first inner angular bearing surface 61a such that the first outer angular bearing surface 62a contacts and supports each of the first rolling members 60 at an outer peripheral area and an axial facing area. The first outer angular bearing surface 62a faces away from the second axle end. The first outer race 62 has a first outer peripheral surface with first external threads 62c that are threadedly engaged with first internal threads 32i formed on the inner tubular surface of the hub shell 32.

The first outer peripheral surface of the first outer race 62 is preferably step shaped to form first and second axial step surfaces that mate with the first and second axial step sections 32g and 32h of the inner tubular surface of the-hub shell 32. The first axial step surface of the first outer race 62 that has the first external threads 62c is larger than the second axial step surface of the first outer race 62.

The second or right side bearing 33b is disposed between the second axle end 40b of the hub axle 40 and the second shell end 32b of the hub shell 32 to rotatably support the second shell end 32b of the hub shell 32 on the second axle end 40b of the hub axle 40. The bearing 33b basically includes a plurality of second balls 70 located between a second inner race 71 supported on the second axle end of the hub axle 40 and a second outer race 72 threadedly coupled to the second internal threads 32m of the hub shell 32.

The second inner race 71 includes a second inner angular bearing surface 71a contacting one axial side of the second rolling members 70 such that the second inner angular bearing surface 71a contacts and supports each of the second rolling members 70 at an inner peripheral area and an axial facing area. The second inner angular bearing surface 71a faces generally towards the first axle end of the hub shell 32.

The second outer race 72 includes a second outer angular bearing surface 72a contacting the second rolling members 70 on an axial side that is opposite from the second inner angular bearing surface 71a such that the second outer angular bearing surface 72a contacts and supports each of the second rolling members 70 at an outer peripheral area and an axial facing area. The second outer angular bearing surface 72a faces away from the first axle end of the hub shell 32. The second outer race 72 has a second outer peripheral surface with second external threads 72c that are threadedly engaged with the second internal threads 32m formed on the inner tubular surface of the hub shell 32.

The second outer peripheral surface of the second outer race 72 is preferably step shaped to form first and second axial step surfaces that mate with the first and second axial step sections 32j and 32k of the inner tubular surface of the hub shell 32. The second axial step surface of the second outer race 72 that has the first external threads 72c is larger than the second axial step surface of the second outer race 72.

When the locking nuts 52a and 52b are threaded on to the external threads 42b of the hub sleeve 42, an axial compressive force is applied directly to the first and second inner races 61 and 71 of the first and second bearings 33a and 33b, respectively. In particular, the locking nut 52b directly contacts the first inner race 61 of the first bearing 33a, while the center annular abutment 42c directly contacts the second inner race 71 of the second bearing 33b to apply the axial compressive force directly to the first and second inner races 61 and 71 of the first and second bearings 33a and 33b. This axial compressive force is not applied directly to the first and second outer races 62 and 72 of the first and second bearings 33a and 33b, respectively, since the locking nut 52b and the center annular abutment 42c do not contact the first and second outer races 62 and 72 of the first and second bearings 33a and 33b. Thus, the locking nuts 52a and 52b can be tightened to compensate for wear in the first and second bearings 33a and 33b.

Referring again to FIG. 5, the freewheel 34 is operatively coupled between the second end of the hub axle 40 and the second end of the hub shell 32. The freewheel 34 is relatively conventional, and thus, will not be discussed or illustrated in detail herein. The freewheel 34 is partially recessed into the second spoke flange 32f. In particular, the second spoke flange 32f has a recess 32n that is concentric with the interior passage 32c for receiving an inner portion of the freewheel 34. In other words, the second spoke flange 32f overlaps the inner portion of the freewheel 34.

Referring to FIG. 16, the freewheel 34 is coupled to the hub shell 32 in a relatively conventional manner. The sprockets 28 are mounted on the freewheel 34 in a relatively conventional manner such that rotation of the sprockets 28 results in rotation of the freewheel 34. Rotation of the freewheel 34 in turn rotates the hub shell 32. The freewheel 34 basically includes of a driving cylinder 80, a driven cylinder 82, a unidirectional rotation transmission mechanism 86 and a pair of ball bearings 88 that are axially spaced apart by a cylindrical spacer 90.

The driving cylinder 80 is a tubular member having an outer peripheral surface with a plurality of axially extending splines 80a formed at its outer end and a plurality of transmission pawls 80b (only one shown in FIGS. 5 and 16) coupled to at its inner end. The inner peripheral surface of the driving cylinder 80 is rotatably supported on the hub sleeve 42 by the ball bearings 88. The transmission pawls 80b form a first part of the unidirectional rotation transmission mechanism 86. Thus, the inner axial end of the driving cylinder 80 is operatively coupled to the driven cylinder 82 via the unidirectional rotation transmission mechanism 86. The splines 80a non-rotatably couple the sprockets 28 to the outer peripheral surface of the driving cylinder 80. Thus, the sprockets 28 are mounted to the driving cylinder 80 for transmitting torque to the hub shell 32 via the unidirectional rotation transmission mechanism 86.

The driven cylinder 82 has its outer peripheral surface fixed to an inner peripheral surface of the recess 32n formed in the second shell end 32b of the hub shell 32. The driven cylinder 82 has an inner peripheral surface with serrated teeth 82a that form a second part of the unidirectional rotation transmission mechanism 86. Thus, the unidirectional rotation transmission mechanism 86 is constructed of the transmission pawls 80b and the serrated teeth 82a that form a one-way clutch that is operatively coupled between the driving cylinder 80 and the driven cylinder 82. The transmission pawls 80b are moved outwardly in a radial direction to mesh with the serrated teeth 82a due to centrifugal forces occurring from the positive rotation of the driving cylinder 80. This engagement of the transmission pawls 80b with the serrated teeth 82a transmits the driving power or torque from the freewheel 34 to the hub shell 32 that is splined engaged with the driven cylinder 82.

As mentioned above, the ball bearings 88 rotatably support the driven cylinder 82 on the hub sleeve 42 such that the driven cylinder 82 and the hub shell 32 rotates in one direction relative to the driving cylinder 80. In other words, the driven cylinder 82 is adapted, by means of the unidirectional rotation transmission mechanism 86 and the ball bearings 88, to freely rotate in one direction relative to the driving cylinder 80.

As used herein, the following directional terms "forward, rearward, above, downward, vertical, horizontal, below and transverse" as well as any other similar directional terms refer to those directions relative to a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub axle assembly comprising:

a hub axle including a shaft portion having a first axle end with a threaded section and a second axle end with a center axis extending between the first and second axle ends, and a head portion fixedly coupled to the second axle end of the shaft portion; and a hub axle nut including a body portion having a frame engaging surface with a threaded bore extending axially from the frame engaging surface, and a projection extending axially from the frame engaging surface, the projection being configured to engage a slot in a bicycle frame, and that the threaded bore being threadedly engaged with the threaded section of the first axle end of the shaft portion.

2. The bicycle hub axle assembly according to claim 1, wherein the body portion and the projection are integrally formed as a one-piece, unitary member.

3. The bicycle hub axle assembly according to claim 1, wherein the body portion has a circular transverse cross section.

4. The bicycle hub axle assembly according to claim 1, wherein the body portion has a non-circular transverse cross section.

5. The bicycle hub axle assembly according to claim 1, wherein the shaft portion and the head portion are integrally formed as a one-piece, unitary member.

6. The bicycle hub axle assembly according to claim 1, wherein the head portion is configured with a tool engagement surface.

7. The bicycle hub axle assembly according to claim 6, wherein the tool engagement surface of the head portion is an axially extending blind bore with a non-circular transverse cross section.

8. A bicycle hub assembly comprising:

a hub axle including a shaft portion having a first axle end with a threaded section and a second axle end with a center axis extending between the first and second axle ends, and a head portion fixedly coupled to the second axle end of the shaft portion;

a hub axle nut including a body portion having an axially extending threaded bore that is threadedly engaged with the threaded section of the first axle end of the shaft portion, and a frame engaging surface having an axially extending projection that is configured to engage a slot in a bicycle frame;

a hub shell having a first shell end and a second shell end with an inner tubular surface forming a central passage extending between the first and second shell ends, the hub axle being disposed within the central passage of the hub shell; and a bearing assembly disposed between the hub axle and the hub shell to rotatably support the hub shell on the hub axle.

9. The bicycle hub assembly according to claim 8, wherein the body portion and the projection are integrally formed as a one-piece, unitary member.

10. The bicycle hub assembly according to claim 8, wherein the body portion has a circular transverse cross section.

11. The bicycle hub assembly according to claim 8, wherein the body portion has a non-circular transverse cross section.

12. The bicycle hub assembly according to claim 8, wherein the shaft portion and the head portion are integrally formed as a one-piece, unitary member.

13. The bicycle hub assembly according to claim 8, wherein the head portion is configured with a tool engagement surface.

14. The bicycle hub assembly according to claim 8, wherein the tool engagement surface of the head portion is an axially extending blind bore with a non-circular transverse cross section.

15. The bicycle hub assembly according to claim 8, further comprising a freewheel operatively coupled between the second axle end of the hub axle and of the hub shell.

* * * * *